(12) United States Patent
Sui et al.

(10) Patent No.: US 7,658,114 B1
(45) Date of Patent: Feb. 9, 2010

(54) ULTRASONIC FLOW METER

(75) Inventors: Lei Sui, Billerica, MA (US); Toan Nguyen, Billerica, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/272,174

(22) Filed: Nov. 17, 2008

(51) Int. Cl.
*G01F 1/66* (2006.01)

(52) U.S. Cl. .................................. 73/861.27

(58) Field of Classification Search ............. 73/861.27, 73/861.29, 861.31, 861.06, 861.95, 861.18, 73/861.25

See application file for complete search history.

(56) References Cited

U.S. PATENT DOCUMENTS

| | | | |
|---|---|---|---|
| 3,753,111 A | 8/1973 | Denbnovetsky et al. | |
| 4,014,211 A * | 3/1977 | Araki et al. ............. | 73/861.27 |
| 4,375,767 A | 3/1983 | Magori et al. | |
| 4,397,194 A | 8/1983 | Soltz | |
| 4,408,589 A * | 10/1983 | Hauler et al. ............... | 123/494 |
| 4,452,090 A | 6/1984 | Kou et al. | |
| 4,468,971 A | 9/1984 | Herzl et al. | |
| 4,483,202 A | 11/1984 | Ogura et al. | |
| 4,544,884 A | 10/1985 | Hayashi et al. | |
| 4,610,167 A | 9/1986 | McShane | |
| 4,924,710 A * | 5/1990 | Inada et al. ............. | 73/861.23 |
| 4,930,358 A | 6/1990 | Motegi et al. | |
| 5,277,070 A | 1/1994 | Dorr | |
| 5,337,335 A | 8/1994 | Cloetens et al. | |
| 5,526,699 A | 6/1996 | Dorr | |
| 5,694,377 A | 12/1997 | Kushnick | |
| 5,764,045 A | 6/1998 | Hayashi et al. | |
| 5,796,682 A | 8/1998 | Swapp | |
| 5,818,797 A | 10/1998 | Watanabe et al. | |
| 5,867,453 A | 2/1999 | Wang et al. | |
| 5,903,176 A | 5/1999 | Westgate | |
| 5,903,522 A | 5/1999 | Carley | |
| 5,997,480 A | 12/1999 | Sumanaweera et al. | |
| 6,012,338 A | 1/2000 | Chang et al. | |
| 6,081,484 A | 6/2000 | West | |
| 6,293,156 B1 | 9/2001 | Shen et al. | |
| 6,293,914 B1 | 9/2001 | Sumanaweera et al. | |
| 6,460,419 B2 | 10/2002 | Su et al. | |
| 6,501,706 B1 | 12/2002 | West | |
| 6,595,071 B1 | 7/2003 | Doten | |
| 6,597,213 B1 | 7/2003 | Weintraub | |
| 6,615,674 B2 | 9/2003 | Ohnishi et al. | |
| 6,626,049 B1 | 9/2003 | Ao | |
| 6,634,239 B2 * | 10/2003 | Gomm et al. ............ | 73/861.27 |

(Continued)

*Primary Examiner*—Jewel Thompson
(74) *Attorney, Agent, or Firm*—GE Global Patent Operation

(57) ABSTRACT

In one embodiment, an ultrasonic flow meter is provided for measuring a flow rate of a medium flowing through a conduit, the ultrasonic flow meter comprising two ultrasonic emitters and two ultrasonic receivers mounted to the conduit. The flow rate is determined based on a first time interval of a first ultrasonic signal traveling from the first ultrasonic emitter to the first ultrasonic receiver, and a second time interval of a second ultrasonic signal traveling from the second ultrasonic emitter to the second ultrasonic receiver. In some embodiments, the first and second ultrasonic signals travel in a downstream direction with respect to the flow. In other embodiments, the first ultrasonic signal travels along a first transmission path that forms a first angle between the first transmission path and the flow direction, while the second ultrasonic signal travels along a second transmission path that forms a second and different angle between the second transmission path and the flow direction.

20 Claims, 5 Drawing Sheets

U.S. PATENT DOCUMENTS

| | | |
|---|---|---|
| 6,726,628 B2 | 4/2004 | Vilkomerson |
| 6,741,522 B1 | 5/2004 | Lin |
| 6,826,965 B1 * | 12/2004 | Liu ................ 73/861.29 |
| 6,907,361 B2 | 6/2005 | Molenaar et al. |
| 6,989,625 B2 | 1/2006 | Suzuki et al. |
| 7,000,485 B2 | 2/2006 | Ao et al. |
| 7,252,015 B2 | 8/2007 | Konzelmann et al. |
| 7,363,174 B2 | 4/2008 | Kishiro et al. |
| 7,380,470 B2 | 6/2008 | Konzelmann et al. |
| 2002/0139198 A1 | 10/2002 | Ohnishi |
| 2003/0172743 A1 | 9/2003 | Ao et al. |
| 2004/0176917 A1 | 9/2004 | Molenaar et al. |
| 2006/0020404 A1 | 1/2006 | Kishiro et al. |
| 2006/0117867 A1 | 6/2006 | Froehlich et al. |
| 2007/0084286 A1 | 4/2007 | Ajay et al. |
| 2007/0274434 A1 | 11/2007 | Arkas et al. |

* cited by examiner

ULTRASONIC FLOW METER

FIELD OF THE INVENTION

This invention is generally related to flow meters, and more specifically to an ultrasonic flow meter designed to determine a flow rate of a medium flowing through a conduit using measured travel times of ultrasonic signals passing through that medium.

BACKGROUND OF THE INVENTION

Using ultrasonic flow meters for measuring high-velocity flow rates, particularly gas flow rates, can present a considerable challenge because the signal quality deteriorates quickly as the flow rate increases. Poor signal quality at high flow rates, usually resulting in low signal-to-noise ratios (SNR), can be attributed to such factors as beam drift induced by the high-velocity flow, greatly increased noise level experienced at high flow rates, and turbulence-related attenuation, scattering and distortion of ultrasonic signals. Although the noise at high velocities can be minimized by applying known signal processing techniques, and beam drift can be partly compensated for by applying methods known in the art, turbulence-caused attenuation and distortion remain problems in the art. Therefore, a need exists to provide an ultrasonic flow meter which is capable of producing reliable results at high flow rates up to and exceeding 120 m/s.

SUMMARY OF THE INVENTION

In one embodiment, an ultrasonic flow meter is provided for measuring a flow rate of a medium flowing through a conduit in a flow direction, the ultrasonic flow meter comprising: a first ultrasonic emitter and a second ultrasonic emitter mounted to the conduit; a first ultrasonic receiver mounted to the conduit and configured to receive a first ultrasonic signal emitted by the first ultrasonic emitter; a second ultrasonic receiver mounted to the conduit and configured to receive a second ultrasonic signal emitted by the second ultrasonic emitter; and wherein the flow rate is determined based on a first time interval of the first ultrasonic signal traveling from the first ultrasonic emitter to the first ultrasonic receiver, and a second time interval of the second ultrasonic signal traveling from the second ultrasonic emitter to the second ultrasonic receiver. In some embodiments, the first ultrasonic signal travels downstream or substantially perpendicular to the flow direction along a first transmission path, and the second ultrasonic signal travels downstream with respect to said flow direction along a second transmission path. In other embodiments, the first ultrasonic signal travels along a first transmission path and forms a first angle between the first transmission path and the flow direction, and the second ultrasonic signal travels along a second transmission path and forms a second and different angle between the second transmission path and the flow direction.

In another embodiment, a method of measuring a flow rate of a medium flowing through a conduit in a flow direction is provided, the method comprising the steps of: transmitting a first ultrasonic signal from a first ultrasonic emitter mounted to the conduit to a first ultrasonic receiver mounted to the conduit in a direction downstream or substantially perpendicular to the flow direction along a first transmission path and forming a first angle between the first transmission path and the flow direction; measuring a first time interval of the first ultrasonic signal traveling from the first ultrasonic emitter to the first ultrasonic receiver; transmitting a second ultrasonic signal from a second ultrasonic emitter mounted to the conduit to a second ultrasonic receiver mounted to the conduit in a direction downstream to the flow direction along a second transmission path and forming a second angle between the second transmission path and the flow direction; measuring a second time interval of the second ultrasonic signal traveling from the second ultrasonic emitter to the second ultrasonic receiver; and determining the flow rate based on the first time interval and the second time interval.

BRIEF DESCRIPTION OF THE DRAWINGS

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
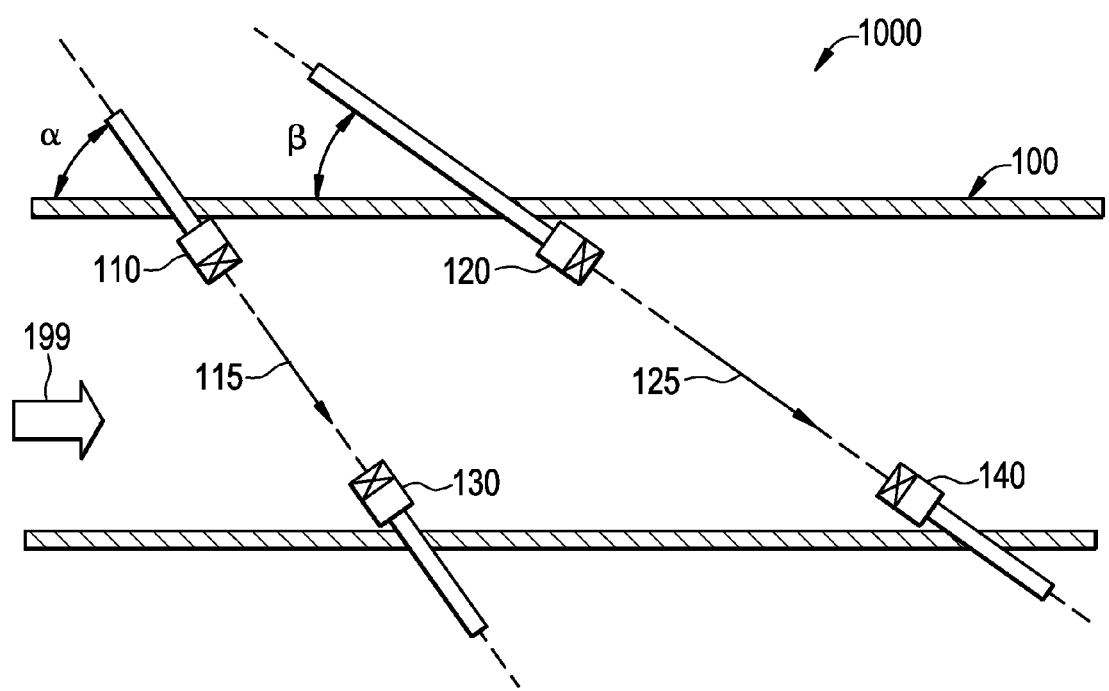
FIG. 1 illustrates a schematic diagram of the ultrasonic flow meter in one embodiment of the invention.

In one embodiment of the invention, there is provided an ultrasonic flow meter 1000 for determining a flow rate of a medium (e.g., a gas or a liquid) flowing through a conduit 100 (e.g., through a pipe) at a flow speed V, as best viewed in FIG. 1. The flow meter 1000 can comprise two ultrasonic emitters 110 and 120, which, in one embodiment, can be mounted on the internal surface of the conduit 100. A skilled artisan will appreciate the fact that other ways of mounting the ultrasonic emitters (e.g., on the external surface of the conduit 100) are within the scope and the spirit of the invention.

The flow meter 1000 can further comprise two ultrasonic receivers 130 and 140, which, in one embodiment, can be mounted on the opposite internal surface of the conduit 100 so that the first ultrasonic receiver 130 can receive ultrasonic signals emitted by the first ultrasonic emitter 110, and the second ultrasonic receiver 140 can receive ultrasonic signals emitted by the second ultrasonic emitter 120. A skilled artisan will appreciate the fact that other ways of mounting the ultrasonic receivers (e.g., on the external surface of the conduit 100) are within the scope and the spirit of the invention.

Figure 2:
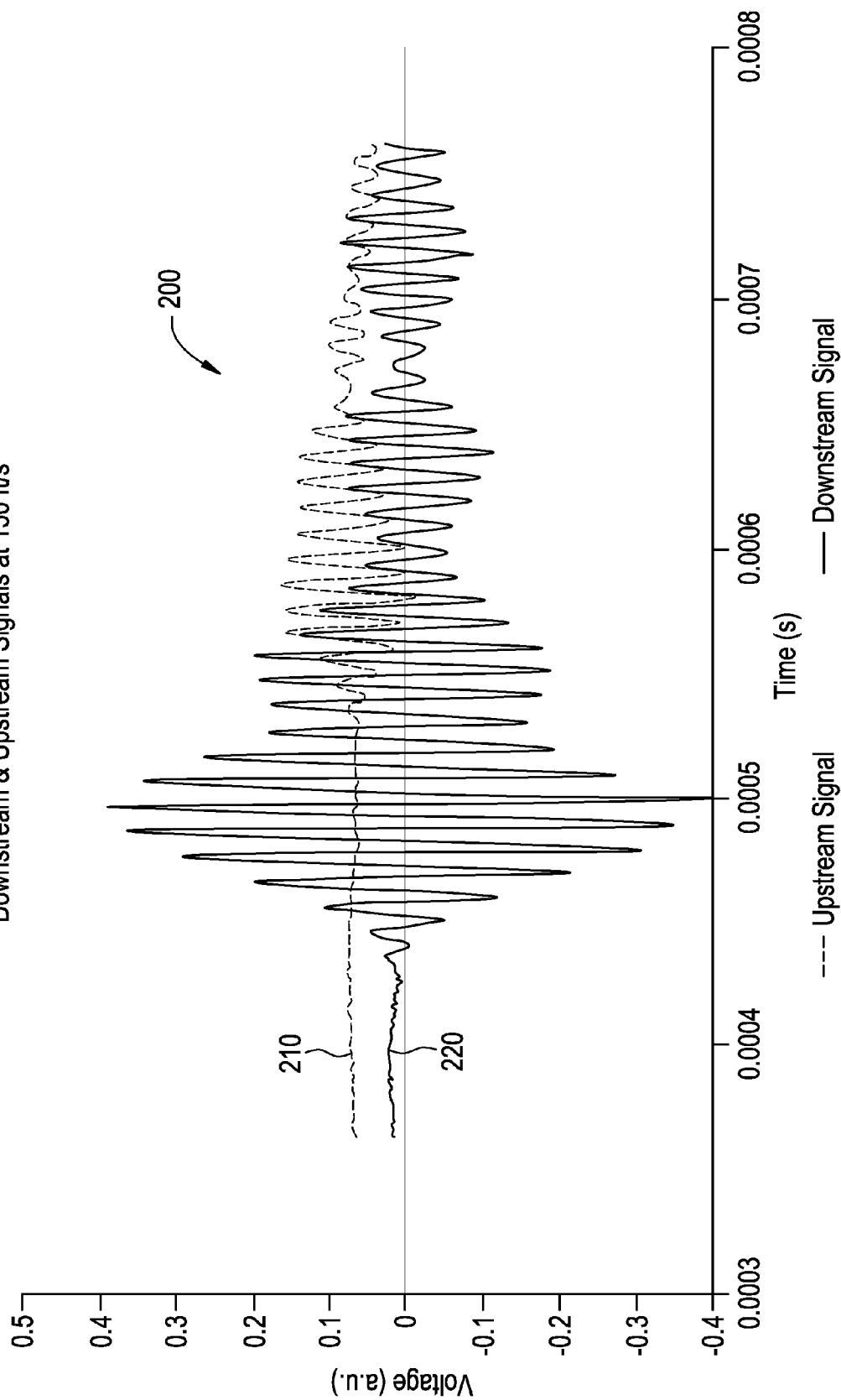
FIG. 2 is an exemplary graph depicting the received signal voltages for equivalent upstream and downstream signals traveling in a common medium.

In one embodiment, the ultrasonic emitter-receiver pairs can be arranged in such a way that at least one ultrasonic receiver is always located downstream (i.e., following the flow direction 199) from the corresponding ultrasonic emitter, since it has been observed that downstream signals normally produce better signal-to-noise ratio (SNR) than upstream signals, especially at high flow velocities. This phenomenon can be explained, to a large extent, by the fact that downstream signals always travel less distance in the flow relative to the medium, and thus incur less loss due to diffraction, absorption, scattering and distortion. FIG. 2 provides a graph 200 depicting an exemplary received upstream signal 210 and downstream signal 220 using a pair of 100 kHz transducers separated by approximately 6.2 inches face-to-face in air at a flow rate of 150 ft/s. The transducers are driven by a 4-cycle square wave centered at 100 kHz with an amplitude of 200V peak-to-peak. As shown, the amplitude of the received downstream signal 220 is about four times stronger than the amplitude of the received upstream signal 210, thus resulting in a better SNR given a constant noise level. As the flow velocity increases, the difference in SNR between upstream signals 210 and downstream signals 220 can increase as well.

Figure 3:
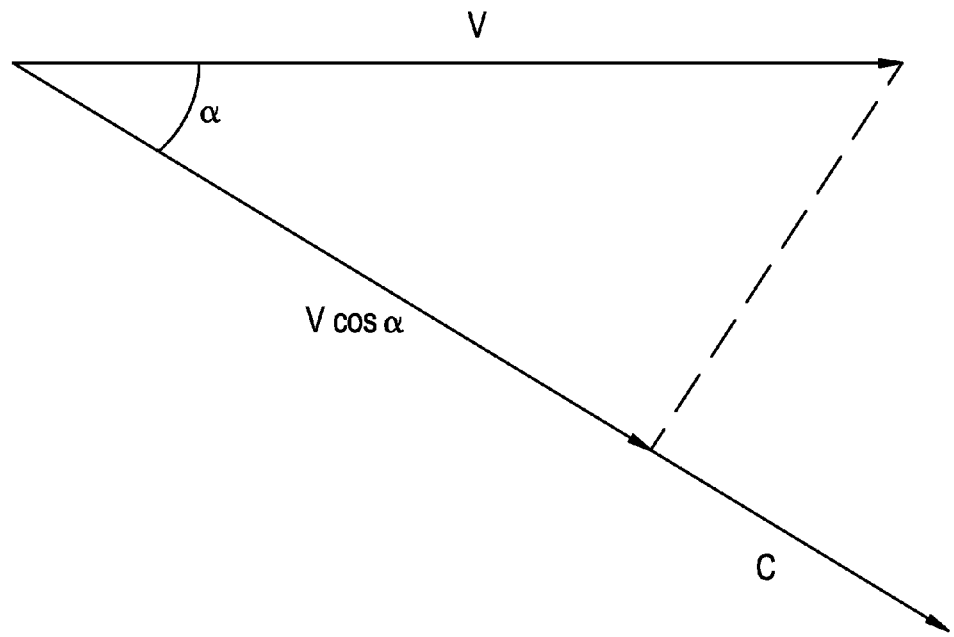
FIG. 3 illustrates a vector of the observed speed of an ultrasonic signal emitted by an ultrasonic emitter in one embodiment of the invention.

Referring again to FIG. 1, assuming that the flow velocity is substantially uniform across the conduit 100, the observed speed of an ultrasonic signal emitted by the ultrasonic emitter 110 traveling along a transmission path 115 to the ultrasonic receiver 130 can be expressed as a sum of the speed of sound, C, in the medium and a component of the vector of the speed of the flow, V, along the transmission path 115, as best viewed in FIG. 3. Thus, the observed speed of an ultrasonic signal can be calculated using the following formula:

$$V_o = C + V \cos \alpha \qquad (1)$$

wherein, $V_o$ is the observed speed of an ultrasonic signal emitted by the ultrasonic emitter 110 traveling along the transmission path 115 to the ultrasonic receiver 130, C is the speed of sound in the medium flowing through the conduit 100, V is the flow rate of the medium flowing through the conduit 100, and $\alpha$ is the angle between the transmission path 115 of the ultrasonic signal emitted by the ultrasonic emitter 110 and the flow direction 199.

Thus, the travel time of an ultrasonic signal emitted by the ultrasonic emitter 110 before the signal reaches the ultrasonic receiver 130 can be expressed as follows:

$$t_1 = P_1/(C + V \cos \alpha) \qquad (2)$$

wherein, $t_1$ is the travel time of an ultrasonic signal emitted by the ultrasonic emitter 110 before the signal reaches the ultrasonic receiver 130, and $P_1$ is the length of the path traveled by the ultrasonic signal from the ultrasonic emitter 110 to the ultrasonic receiver 130.

Similarly, the travel time of an ultrasonic signal emitted by the ultrasonic emitter 120 before the signal reaches the ultrasonic receiver 140 can be expressed as follows:

$$t_2 = P_2/(C + V \cos \beta) \qquad (3)$$

wherein, $t_2$ is the travel time of the ultrasonic signal emitted by the ultrasonic emitter 120 before the signal reaches the ultrasonic receiver 140, and $P_2$ is the length of the path traveled by the ultrasonic signal from the ultrasonic emitter 120 to the ultrasonic receiver 140, and $\beta$ is the angle between a transmission path 125 of the ultrasonic signal emitted by the ultrasonic emitter 120 and the flow direction 199.

Using equation (3), the speed of sound, C, in the medium can be determined as follows:

$$C = P_2/t_2 - V \cos \beta \qquad (4)$$

Using equation (2) and substituting C from equation (4), the flow rate, V, of the medium can be determined as follows (arithmetical transformations are omitted for clarity):

$$V = (P_1/t_1 - P_2/t_2)/(\cos \alpha - \cos \beta) \qquad (5)$$

Using equation (4) and substituting V from equation (5), the speed of sound, C, in the medium flowing through conduit 100 can be determined as follows (arithmetical transformations are omitted for clarity):

$$C = (P_1 \cos \beta/t_1 - P_2 \cos \alpha/t_2)/(\cos \beta - \cos \alpha) \qquad (6)$$

From equations (5) and (6) it follows that the positioning of the ultrasonic emitters 110 and 120 and receivers 130 and 140 greatly affect the accuracy of determining the flow rate and the speed of sound in the medium. For example, larger differences between the angles $\alpha$ and $\beta$ can lead to more accurate results. However, in a particular application the arrangement of the ultrasonic emitters 110 and 120 and receivers 130 and 140 can be affected by geometrical dimensions of the conduit 100.

In the embodiment illustrated in FIG. 1, the ultrasonic receivers 130 and 140 are located downstream (i.e., following the flow direction 199) from respective ultrasonic emitters 110 and 120, so that the angles $\alpha$ and $\beta$ between the respective ultrasonic signal transmission paths 115 and 125 and the flow direction 199 are acute angles. Hence, only downstream signals will be measured, thereby improving the SNR of the results.

Figure 4:
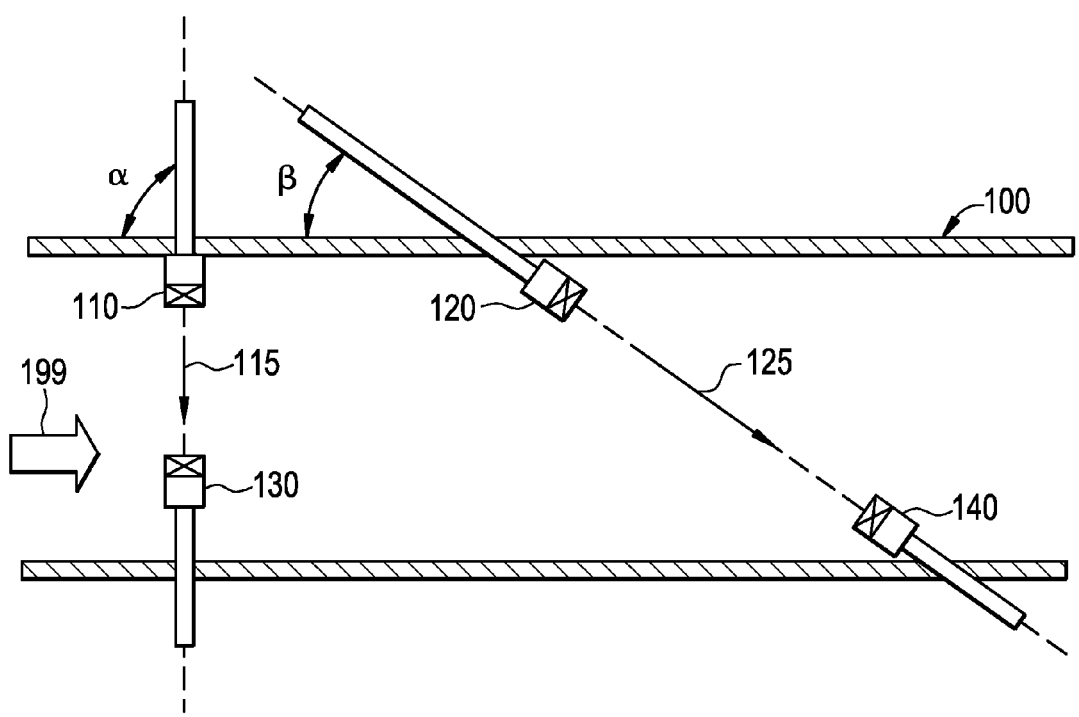
FIGS. 4-7 illustrate methods of arranging ultrasonic emitters and receivers in other embodiments of the invention.

In another embodiment, illustrated in FIG. 4, the ultrasonic emitter 110 and ultrasonic receiver 130 are mounted to the conduit 100 so that the angle $\alpha$ between the transmission path 115 of the ultrasonic signal emitted by the ultrasonic emitter 110 and the flow direction 199 is substantially 90°. Hence, the ultrasonic signal emitted by the ultrasonic emitter 110 travels along a path substantially perpendicular to the flow direction 199.

Figure 5:
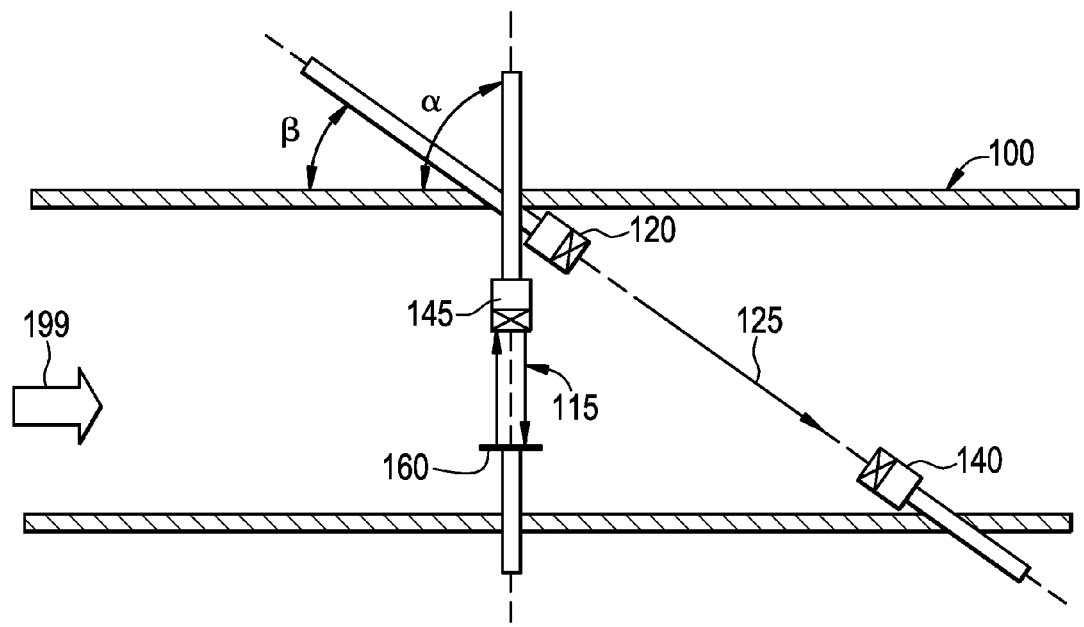

In another embodiment, illustrated in FIG. 5, the ultrasonic emitter and ultrasonic receiver are provided by an ultrasonic transducer 145 mounted to the conduit 100 that is capable of both transmitting and receiving ultrasonic signals. In this embodiment, an ultrasonic reflector 160 mounted to the conduit 100 opposite the ultrasonic transducer 145 can be used to reflect the signal emitted by the transducer 145 back to the transducer 145. The ultrasonic signal emitted by the ultrasonic transducer 145 travels along the transmission path 115 substantially perpendicular to the flow direction 199, is reflected by the ultrasonic reflector 160, and is received back by the ultrasonic transducer 145. By eliminating individual emitters and receivers this embodiment can also reduce the total cost of the flow meter.

Figure 6:
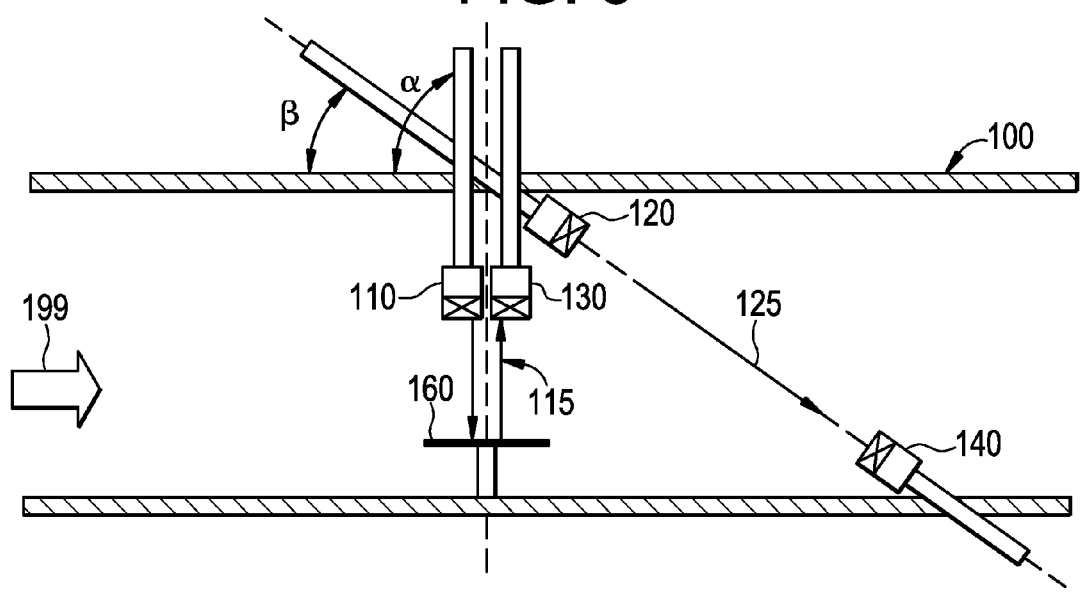

In another embodiment, illustrated in FIG. 6, the ultrasonic receiver 130 is mounted to the conduit 100 in the immediate vicinity of the ultrasonic emitter 110. The ultrasonic signal emitted by the ultrasonic emitter 110 travels along the transmission path 115 substantially perpendicular to the flow direction 199, is reflected by the ultrasonic reflector 160, and is received by the ultrasonic receiver 130. Using an ultrasonic receiver 130 mounted near the ultrasonic emitter 110 instead of a single ultrasonic transducer minimizes cross talk and ring down effects, thus increasing the accuracy of the measurements.

Figure 7:
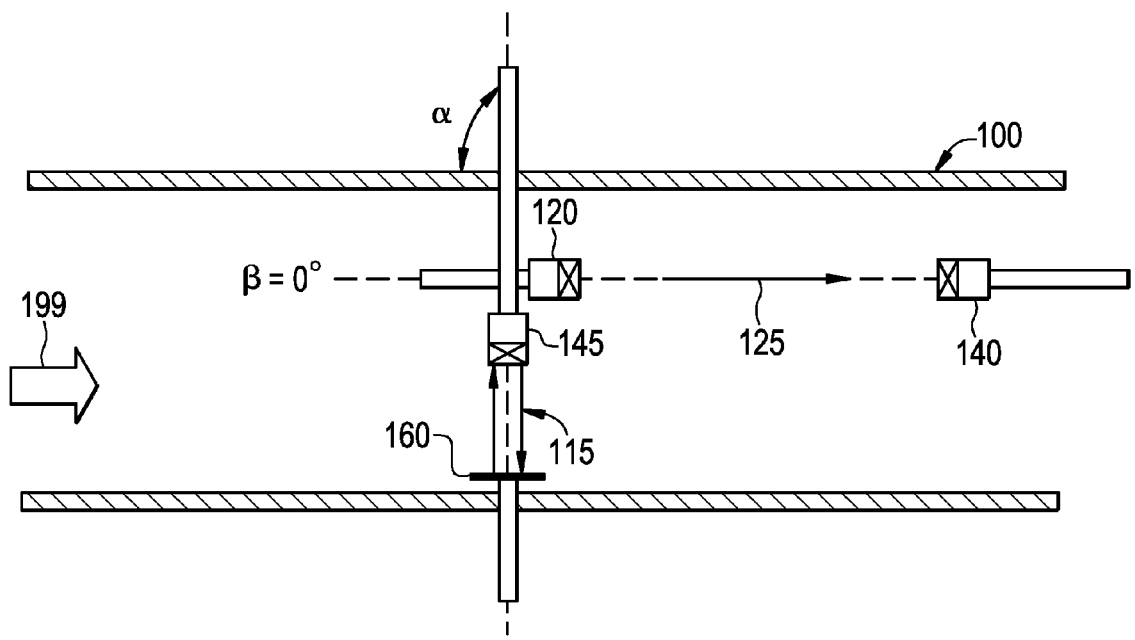

In another embodiment, illustrated in FIG. 7, the angle difference between two paths of ultrasonic signals emitted by the ultrasonic transducer 145 and the ultrasonic emitter 120 is maximized (i.e., $\alpha=90°$ and $\beta=0°$), thus increasing the accuracy of the results.

In a further aspect of the invention, a recovery angle can be applied to any of the configurations described herein if beam drift resulting from the flow of the medium needs to be compensated for. In addition, it has also been observed that the recovery angle method improves downstream received signal amplitude to a greater extent than upstream signals.

In a still further aspect of the invention, the ultrasonic emitters 110 and 120 and ultrasonic receivers 130 and 140, or ultrasonic transducer 145, can be arranged such that the ultrasonic signals emitted are directed upstream in relation to the flow of the medium.

This written description uses examples to disclose the invention, including the best mode, and to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An ultrasonic flow meter for measuring a flow rate of a medium flowing through a conduit in a flow direction, said ultrasonic flow meter comprising:
    a first ultrasonic emitter and a second ultrasonic emitter mounted to said conduit;
    a first ultrasonic receiver mounted to said conduit and configured to receive a first ultrasonic signal emitted by said first ultrasonic emitter, wherein said first ultrasonic signal travels downstream or substantially perpendicular to said flow direction along a first transmission path length and forms a first angle between said first transmission path and said flow direction;
    a second ultrasonic receiver mounted to said conduit and configured to receive a second ultrasonic signal emitted by said second ultrasonic emitter, wherein said second ultrasonic signal travels downstream with respect to said flow direction along a second transmission path length and forms a second angle between said second transmission path and said flow direction, and wherein said first angle and said second angle are different; and
    wherein said flow rate is determined based on a first time interval of said first ultrasonic signal traveling from said first ultrasonic emitter to said first ultrasonic receiver, and a second time interval of said second ultrasonic signal traveling from said second ultrasonic emitter to said second ultrasonic receiver.

2. The ultrasonic flow meter of claim 1, wherein said first ultrasonic signal travels substantially perpendicular to said flow direction.

3. The ultrasonic flow meter of claim 2, further comprising an ultrasonic reflector mounted to said conduit, wherein said first ultrasonic signal travels from said first ultrasonic emitter to said ultrasonic reflector and is reflected back to said first ultrasonic receiver.

4. The ultrasonic flow meter of claim 3, wherein said first ultrasonic emitter and said first ultrasonic receiver are provided by an ultrasonic transducer.

5. The ultrasonic flow meter of claim 1, wherein said flow rate is determined as a difference between a first ratio of said first transmission path length to said first time interval and a second ratio of said second transmission path length to said second time interval, said difference further divided by a difference between a cosine of said first angle and a cosine of said second angle.

6. The ultrasonic flow meter of claim 1, wherein a speed of sound in said medium is determined based on said first time interval and said second time interval.

7. The ultrasonic flow meter of claim 6, wherein a speed of sound in said medium is determined as a difference between a first ratio of said first transmission path length multiplied by a cosine of said second angle to said first time interval, and a second ratio of said second transmission path length multiplied by a cosine of said first angle to said second time interval, said difference further divided by a difference between said cosine of said second angle and said cosine of said first angle.

8. The ultrasonic flow meter of claim 1, wherein at least one of said ultrasonic emitters and said ultrasonic receivers is mounted on an internal surface of said conduit.

9. A method of measuring a flow rate of a medium flowing through a conduit in a flow direction, said method comprising the steps of:
    transmitting a first ultrasonic signal from a first ultrasonic emitter mounted to said conduit to a first ultrasonic receiver mounted to said conduit in a direction downstream or substantially perpendicular to said flow direction along a first transmission path length and forming a first angle between said first transmission path and said flow direction;
    transmitting a second ultrasonic signal from a second ultrasonic emitter mounted to said conduit to a second ultrasonic receiver mounted to said conduit in a direction downstream to said flow direction along a second transmission path length and forming a second angle between said second transmission path and said flow direction, wherein said first angle and said second angle are different;
    measuring a first time interval of said first ultrasonic signal traveling from said first ultrasonic emitter to said first ultrasonic receiver;
    measuring a second time interval of said second ultrasonic signal traveling from said second ultrasonic emitter to said second ultrasonic receiver; and
    determining said flow rate based on said first time interval and said second time interval.

10. The method of claim 9, wherein said first ultrasonic signal travels substantially perpendicular to said flow direction.

11. The method of claim 10, further comprising the step of reflecting said first ultrasonic signal traveling from said first ultrasonic emitter back to said first ultrasonic receiver.

12. The method of claim 11, wherein said first ultrasonic emitter and said first ultrasonic receiver are provided by an ultrasonic transducer.

13. The method of claim 9, wherein said step of determining said flow rate comprises determining a difference between a first ratio of said first transmission path length to said first time interval and a second ratio of said second transmission path length to said second time interval, said difference further divided by a difference between a cosine of said first angle and a cosine of said second angle.

14. The method of claim 9, further comprising a step of determining a speed of sound in said medium based on said first time interval and said second time interval.

15. The method of claim 14, wherein said step of determining said speed of sound in said medium comprises determining a difference between a first ratio of said first transmission path length multiplied by a cosine of said second angle to said first time interval, and a second ratio of said second transmission path length multiplied by a cosine of said first angle to said second time interval, said difference further divided by a difference between said cosine of said second angle and said cosine of said first angle.

16. An ultrasonic flow meter for measuring a flow rate of a medium flowing through a conduit in a flow direction, said ultrasonic flow meter comprising:
    a first ultrasonic emitter and a second ultrasonic emitter mounted to said conduit;
    a first ultrasonic receiver mounted to said conduit and configured to receive a first ultrasonic signal emitted by said first ultrasonic emitter, wherein said first ultrasonic signal travels along a first transmission path length and forms a first angle between said first transmission path and said flow direction;

a second ultrasonic receiver mounted to said conduit and configured to receive a second ultrasonic signal emitted by said second ultrasonic emitter, wherein said second ultrasonic signal travels along a second transmission path length and forms a second angle between said second transmission path and said flow direction; and wherein said first angle and said second angle are different; and wherein said flow rate is determined based on a first time interval of said first ultrasonic signal traveling from said first ultrasonic emitter to said first ultrasonic receiver, and a second time interval of said second ultrasonic signal traveling from said second ultrasonic emitter to said second ultrasonic receiver.

17. The ultrasonic flow meter of claim 16, wherein said first ultrasonic signal travels substantially perpendicular to said flow direction.

18. The ultrasonic flow meter of claim 17, further comprising an ultrasonic reflector mounted to said conduit, wherein said first ultrasonic signal travels from said first ultrasonic emitter to said ultrasonic reflector and is reflected back to said first ultrasonic receiver.

19. The ultrasonic flow meter of claim 18, wherein said first ultrasonic emitter and said first ultrasonic receiver are provided by an ultrasonic transducer.

20. The ultrasonic flow meter of claim 16, wherein said first ultrasonic signal travels downstream or substantially perpendicular to said flow direction, and wherein said second ultrasonic signal travels downstream with respect to said flow direction.

* * * * *